Nov. 1, 1927.
H. C. BUFFINGTON
1,647,268
TRUCK JACK
Filed Sept. 21, 1925
3 Sheets-Sheet 2
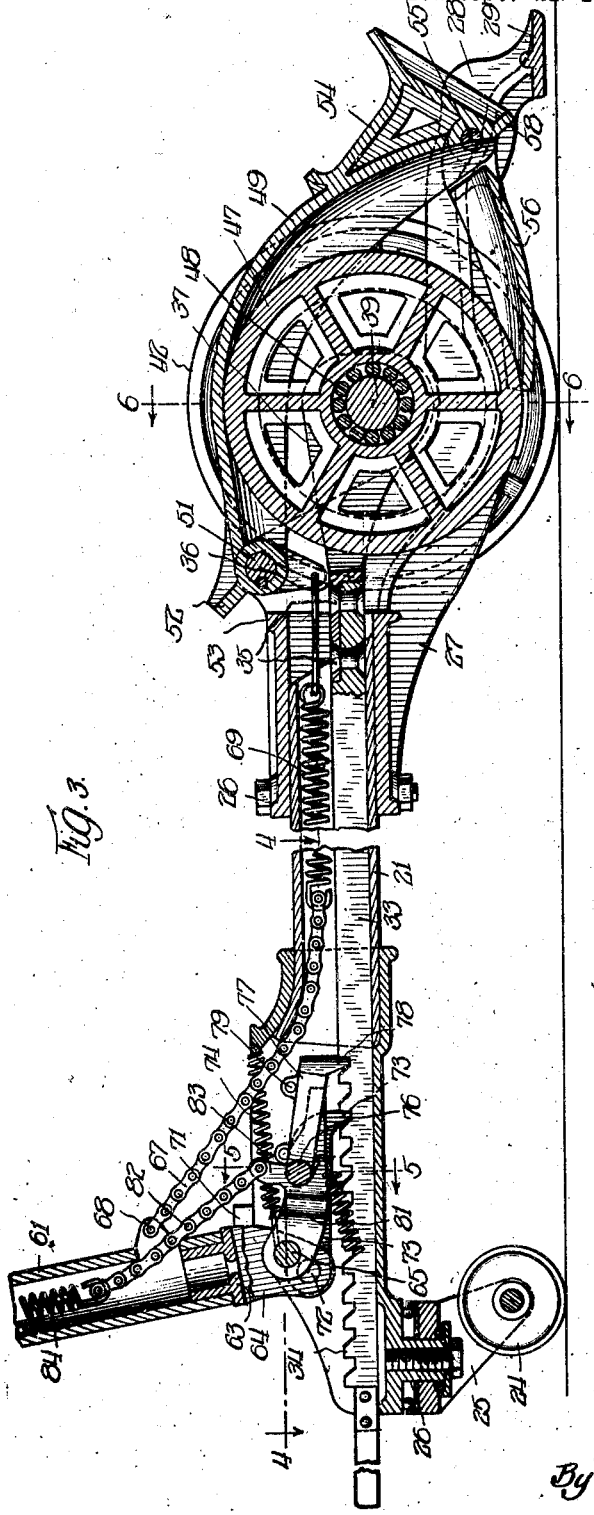
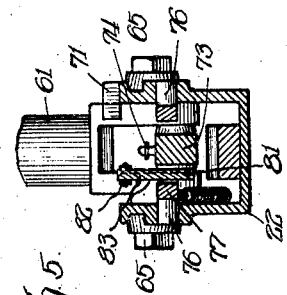
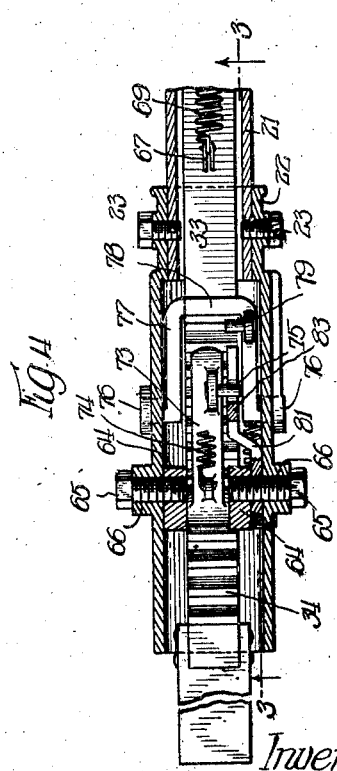
Inventor:
Harry C. Buffington
By Walter M. Fuller Atty.

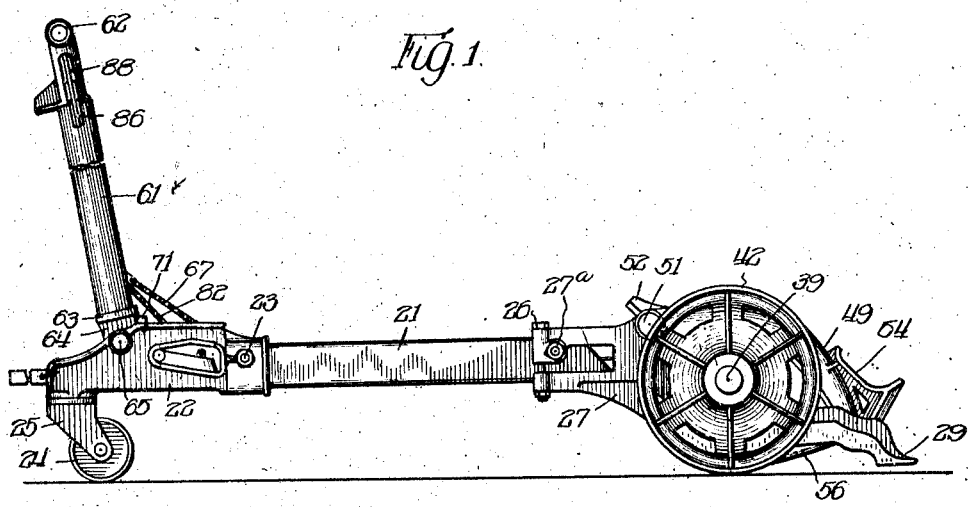
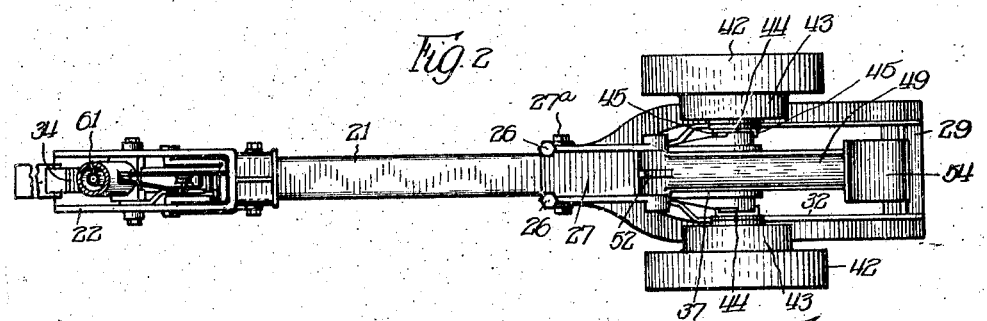

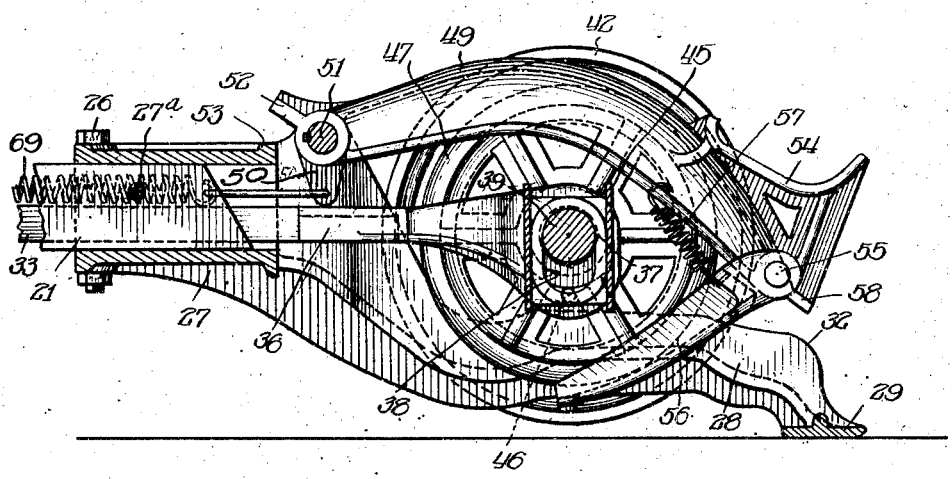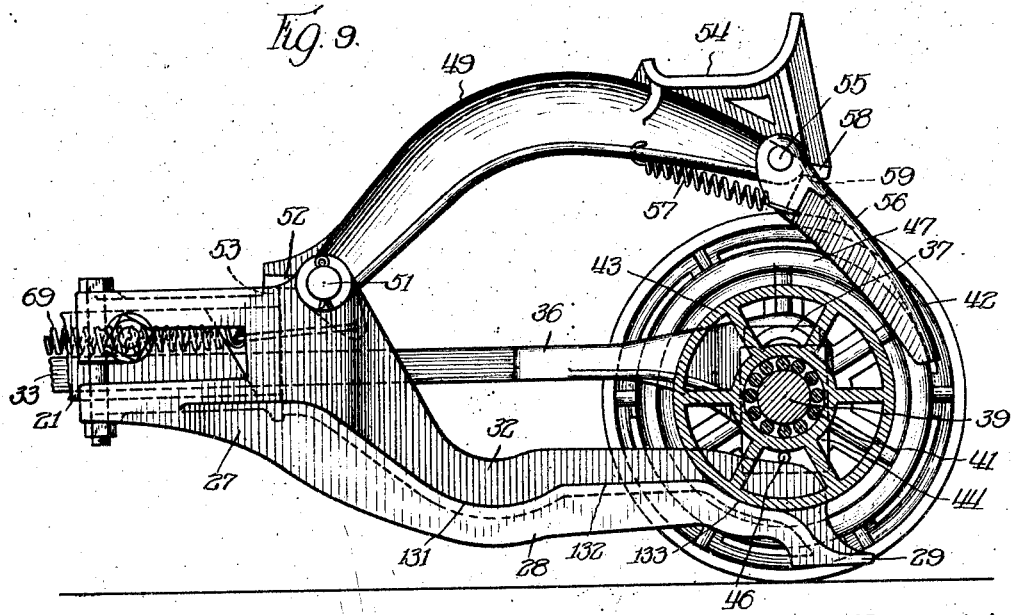

Patented Nov. 1, 1927.

1,647,268

UNITED STATES PATENT OFFICE.

HARRY C. BUFFINGTON, OF SPRINGFIELD, ILLINOIS, ASSIGNOR TO WEAVER MANUFACTURING COMPANY, OF SPRINGFIELD, ILLINOIS, A CORPORATION OF ILLINOIS.

TRUCK JACK.

Application filed September 21, 1925. Serial No. 57,505.

With the advent of balloon tire equipment on automobiles and better highway or road conditions, it has been possible and has become more or less common practice to construct automobiles with lower centers of gravity and with relatively low axles, which become still lower when one or both of such tires having large cross-sections are deflated.

With the ordinary type or style of truck-jack, the load-lifting saddle generally carried within the wheel-base of the jack would require wheels of such small diameter to go under the axle that it would be difficult to move the jack with its load on the floor of the average garage and the lifting mechanism would have to be so low to the floor that it would be arduous to obtain a design which would permit the lifting saddle to descend sufficiently to reach under the axle in its extremely low point and then lift high enough so that the tires of the automobile would clear the floor sufficiently to permit them to be removed for repair or change.

The design of the new jack incorporating the present invention is such that all of the objectionable features of the conventional type of truck-jack have been eliminated, the new appliance having the low saddle and the high wheels for easy moving of the load and also having an extremely high lift enabling the tires of the automobile to be removed with facility and dispatch.

One aim or purpose of this invention is to provide a long-bodied truck-jack, that is, a body on which the lifting mechanism is at one end and the operating handle at the other and with a lifting-saddle having a lower reach or descent than the height of the carrying-wheels. In the new appliance, in some embodiments at least, the lifting-saddle extends ahead of the carrying-wheels and is capable of lifting or raising the load upwardly and backwardly of such wheels so that the load finally reaches a point within the wheel-base of the jack.

To the accomplishment of these and other aims and objects I have devised the present preferred embodiment of the invention illustrated in the accompanying drawings, forming a part of this specification, and throughout the several views of which like reference numerals have been employed to designate the same parts, but it is to be borne in mind that the invention is susceptible of a variety of embodiments differing more or less in mechanical details but all incorporating the fundamental principles involved which have been defined in the appended claims.

In these drawings:

Figure 1 is a side elevation of the new truck-jack with the load-lifting saddle in lowered position;

Figure 2 is a plan view of the structure depicted in Figure 1 with a portion of the operating handle omitted;

Figure 3 is an enlarged, fragmentary, longitudinal section through the appliance with the loadlifting saddle in its lowermost position;

Figure 4 is a fragmentary, horizontal section on line 4—4 of Figure 3;

Figure 5 is a vertical section on line 5—5 of Figure 3;

Figure 6 is a vertical cross-section on line 6—6 of Figure 3;

Figure 7 is a partial lengthwise section through the upper portion of the actuating handle;

Figure 8 is a longitudinal sectional view of a portion only of the appliance showing the load-engaging saddle partially elevated and indicating the foot of the frame as engaging the floor; and Figure 9 is a fragmentary, lengthwise section illustrating the load-engaging saddle in fully raised position.

Referring to the plurality of views of these drawings for an understanding of the details of the structure, it will be perceived that the appliance includes a longitudinally-disposed, tubular element 21 desirably square in cross-section.

On one end of this intermediate member 21, a hollow casting 22 of appropriate shape is securely fastened by means of a transverse bolt 23 or in any other convenient manner, the part 22 being supported by a castor-wheel 24, acting as a rear supporting or carrying wheel, revoluble in a bracket 25 swiveled at 26 on the under side of the part 22.

At its other end, by means of upright bolts 26, 26 and a transverse bolt 27ª, the structural element 21 has rigidly mounted thereon a casting 27 of peculiar shape comprising two, spaced, cam arms 28, 28, in cross-section of the form shown in Figure 6 and united together at their lower ends by a foot 29, these spaced arms or sections providing cam surfaces 31, 31 intermediate their top and bottom edges, such arms having upstanding flanges 32, 32.

By means of a peculiar mechanism hereinafter described, this foot, when the load-engaging seat or saddle is in lowered position as shown in Figure 1, is raised or lifted slightly from the floor so that the truck may be rolled thereon with facility, but during the elevation of the load, the foot rests on the floor as presented in Figure 8, and when the load has been fully lifted, the foot rises again from the floor so that the truck may be wheeled around, as illustrated in Figure 9.

The tubular truck-frame element 21 accommodates inside of it a longitudinal, reciprocatory ratchet-bar 33 provided on its top surface for a portion of its length with ratchet-teeth 34, as indicated in Figures 3 and 4, such bar 33 being of a length to extend rearwardly from the frame construction when the seat or saddle is in its lowermost position, whereby, as will be understood from what follows, the operator by pressing on the end of the bar with his foot may lift the saddle readily until it comes into contact with the load whereupon the further lifting action is performed by the usual operating mechanism described hereinafter.

At one end, by means of screws or rivets 35, 35, or otherwise, this part 33 has rigidly fastened thereto a horizontally-disposed yoke 36, the two spaced arms 37, 37 of which are vertically slotted at 38, 38 in register for the accommodation of a transverse axle 39 which at its two ends, by means of roller bearings 41, is equipped with comparatively-large front carrying or supporting-wheels 42, 42 freely rotatable on the axle, each wheel on its inner face having a hollow drum 43 adapted exteriorly to coact with the cam surface 31 of the corresponding part 28 of the main-frame element 27.

As is clearly indicated in Figure 6, the inner edges of these drums 43, 43 coact with the flanges 32, 32 to hold the axle and wheels in normal central position.

As is also shown in this Figure 6, such shaft or axle 39, just inwardly of the hubs of the two front carrying-wheels 42, 42, is supplied with a pair of vertical plates 44, 44 provided centrally with apertures of substantially the same diameter as and receiving the axle 39, each of these plates along its vertical margins having inwardly-disposed guide-flanges 45, 45 overlapping corresponding, upright, guide-surfaces of the complementary arms 37 of the yoke 36, each of such plates 44 on its lower portion being supplied with a transverse stop lug 46 adapted, under certain circumstances, by engagement with the top edge of the companion flange 32 to limit the upward movement of that part of the frame.

Between the yoke arms 37, 37, the axle 39 has a wheel 47 freely rotatable thereon by reason of an interposed roller-bearing 48, this wheel being designed and adapted to actuate or operate the load-lifting and lowering lever 49 of inverted U-shape in cross-section and fulcrumed on the main-frame or casting 27 and fixed on a cross-pin or rod 51 oscillatory in bearings in the main-frame, the upward turning or rocking movement of such arm or lever 49 being limited or restricted by a short extension 52 thereon adapted to engage a stop or abutment 53 on the casting 27 as illustrated, for instance, in Figure 9.

This load-actuating arm or lever near its free end has a seat or saddle 54 adapted to receive the load, such as the axle of an automobile.

At 55, the lever 49 has an extension 56 fulcrumed or hinged thereon, this extension being likewise of U-shape in cross-section and forming when in action a direct prolongation of the lever 49, the extension and lever being connected together by a coiled contractile spring 57 which tends to fold the extension into inoperative position, as shown, for instance in Figures 3 and 8.

In order to limit the turning action or movement of the extension on its pivotal mounting, so that it may constitute a direct and proper prolongation of the main lever 49, these two parts are provided with co-operating abutments 58 and 59, all as is clearly presented in Figure 9.

At the other or rear end of the appliance, a tubular handle 61 having a cross-rod 62 at its upper end is provided at its lower end with a yoke-casting 63, the two spaced arms 64 of which are equipped with fulcrum screws 65 oscillatory in bearings 66, 66 of the casting 22 (see Figure 4).

This operating-handle 61 has a chain 67 fastened thereto at 68, the other end of the chain being connected to a coiled, contractile spring 69, inside of the hollow member 21, and fastened at its other end by means of a link or rod to an arm 50 rigid with the shaft 51, as is clearly shown in Figure 3, the chain extending up out through the open top of the element 22, whereby the spring by its contractile action tends to carry or rock the handle upwardly until it engages a stop 71 limiting such movement.

The lower end of the handle-casting 63 is in the form of a short, double bell-crank arm between the spaced parts of which at 72 an actuating-pawl 73 is fulcrumed, its tooth being adapted to cooperate with those of the ratchet-bar 33 in the lifting and lowering operation of the load-engaging lever, said pawl being pulled down to its work by a coiled, contractile spring 74 connected at one end to the casting 22 and at its other end to a projection on the pawl, the latter having a transverse, projecting pin 75.

Pivoted at 76, 76 in the two side-walls of the casting 22 is a U-shaped pawl member 77 equipped with a tooth or dog 78 and also supplied with a transverse or cross-pin 79, this element 78 constituting the locking or holding pawl coacting with the teeth or shoulders of the longitudinal ratchet-bar.

Pivoted on one of the operating-handle's trunnion screws 65, I employ an offset pawl-controller 81 underlying the two pins 75 and 79 and adapted to be raised or elevated during the lowering operation of the jack by means of a chain 82 connected at one end to an outstanding arm 83 thereon, the other end of the chain, which extends through an opening in the wall of handle 61, being joined by a spring 84 and associated link 85 to a small handle 86 fulcrumed at 87 between outstanding bracket-arms on the upper portion of the main-handle 61, such lever handle 86 being located and movable in slots 88 in opposite walls of the upright handle, whereby, when the hand grasps the cross-bar 62 and holds the lever or handle 86 toward it, the pawl-controlling member 81 will be lifted, the top edge of the latter being of the cam formation shown in Figure 3 to correctly perform the functions hereinafter specified.

The somewhat unusual mode of operation of this appliance occurs practically as follows.

When the load-engaging seat or saddle 54 is in its lowermost position as shown in Figure 1, it is in front of the pair of carrying-wheels 42 of substantial diameter and considerably below their tops, whereby it can be readily introduced below a comparatively low axle, such as is usually present in an automobile when a pneumatic tire of the balloon type has lost its air-cushion as by puncture or otherwise.

This saddle or seat may be easily pushed under such axle by merely rolling the truck into proper position, because the extension foot 29 is then raised slightly off of the floor, as illustrated in Figure 1, by reason of the pulling action of spring 69 which rocks the frame, of which the extension foot forms a part, around the point of contact of the lifting wheel or roller 47 with the lever 49, the carrying-wheels under these circumstances, bearing on the floor and permitting such foot-elevating action because their drums 43, 43 then register with depressions 131 in the cam surfaces 31.

Assuming that the truck-jack has been correctly located in position so that the seat or saddle is below the part of the vehicle to be engaged by it, the operator first quickly elevates the saddle by pressing forwardly with his foot on the protruding rear end of the ratchet-bar and then by grasping the cross-bar or transverse-handle 62, he rocks the operating-handle 61 up and down in a vertical plane more or less in opposition to the lifting tendency of the spring 69.

Such pumping action of the handle forces the ratchet-bar 63 lengthwise forwardly away from the handle step by step in a manner well understood in this art; that is to say, when the handle descends it causes the pawl 73 to feed the bar along one notch or tooth, or more if desired, in which new position the bar is retained by the holding or locking pawl 78 while the other pawl is receding during the upward swing of the handle to engage a new tooth.

A repetition of this rocking action of the handle moves the bar along intermittently.

As the pawl-actuated ratchet-bar 33 shifts lengthwise step by step in this manner, the drums or rollers 43, 43 travel up out of the shallow cam recesses 131, 131 on to the parts 132, 132 of the cams, and, as soon as this takes place, the wheels no longer support that end of the truck but they force the foot 29, which forms a part of the rigid frame, to descend slightly and engage the floor beneath the saddle, as shown in Figure 8.

Were it not for this foot acting in the manner stated, as soon as the saddle assumed the load forwardly of the wheel-base of the truck, it would tilt the latter upwardly in a way to deprive the appliance of the accomplishment of satisfactory results, but, inasmuch as the foot supports the load from directly beneath, no such occurrence takes place.

The downward pressure of such extension foot on the floor also eliminates any possibility of the truck rolling out of the desired and correct position.

As these carrying-wheels thus roll along on the cam tracks, they travel forwardly or outwardly under the load which previously was beyond them, and when the drums 43, 43 reach the portions 133, 133 of the cams, the wheels again assume their carrying function, because the foot is then automatically raised off of the floor, as illustrated in Figure 9, and the truck and its load may be wheeled around, as desired.

During this outward or forward travel of the carrying-wheel 42, 42, the smaller, rounded, intermediate lifting-wheel 47 rolls along under the lever 49 gradually upwardly rocking it and its load carried by the saddle 54.

When this conjoint outward movement of the three wheels is first initiated, the extension 56 is folded under the wheel 47 by reason of the contraction of its controlling spring 57, but, as the wheels travel along, this extension, by the engagement of the wheel or roller 47 with it, is automatically straightened out against the pulling action of the spring 57, whereby it forms a direct extension of the lever 59, and the latter portion of the load-lifting operation, performed by the bodily travel of the wheel 47, is brought about through this extension 57 and the cooperating stops or abutments 58 and 59, the extreme position or elevation of the seat or saddle 54 and the corresponding positions of the lever extension and the foot of the frame being clearly indicated in Figure 9.

Thus it will be perceived that the greater part of the load-elevating operation is performed or carried out while the foot 29 is in contact with the floor and hence there is no danger of the truck-jack rolling out of place during that action, although the carrying-wheels are free to turn and the foot is raised before the load is imposed on the jack, thus permitting the latter to be readily placed in correct position to assume the load, and after the load has been fully lifted, so that it may be transported by the jack as may be required.

The reason that the foot rises from the floor when the load has been fully raised is because of the shape of the cam surfaces 31, 31 which permit the carrying-wheels to bear on the floor at that time due to the inclines 133, 133.

Under these conditions, as the wheel 47 performs the last portion of its lifting action by upwardly rocking lever 49 through its extension 56, it lifts the whole frame, including the foot, by reason of the engagement of the pair of abutments 52 and 53.

In order to prevent the cams 31, 31 from dragging or bearing on the drums 43, 43 when the load is raised to its full height, so that the truck and its load may be rolled around with facility, the lugs 46, 46 are employed on the plates 44, 44 and the top edges of flanges 32, 32, by contact with such elements 46, 46, limit or restrict the rise of the cams 31, 31 sufficiently so that under the condition stated, they are then out of contact with the companion drums.

From the foregoing, it will be understood that the truck-jack has relatively large carrying-wheels whereby it may be easily rolled over a floor when carrying its load, that the latter is first engaged by the jack forwardly of its wheel-base and ultimately lifted and simultaneously shifted inside of such base so that it may be readily transported, and that efficient means are provided to keep the jack from tipping up until the load has been brought within such wheel-base.

To lower the load, the operator rocks the handle as before but at the same time he raises the small handle 86 so that the cam-controller 81 is in action on the pawls, whereby the load descends step by step in a manner common in jacks employing ratchets and coacting pawls.

The foot 29 is down on the floor during the greater part of such load descending action, but it is slightly above the floor before such operation begins and again after it is completed as will be readily understood from what precedes.

During such load lowering function the extension 56 automatically folds into inoperative position as soon as it is permitted to do so.

The new invention is not restricted to this single embodiment, its fundamental principles being broad in scope, as indicated by the annexed claims, and hence capable of incorporation in appliances differing radically in structure but all having its main structural and functional advantages.

I claim:

1. In a truck-jack, the combination of a truck-frame, front and rear carrying-wheel means therefor, a load lifting and lowering element movably mounted on said frame and which in its lower position projects forwardly beyond and below the top of the front carrying-wheel means, an operating-handle, and means actuated by said handle to feed the front carrying-wheel means forwardly or rearwardly to operate said element, said means causing said front carrying-wheel means to bear on the floor in the lowered and in an elevated position of the load and to be raised from the floor in intermediate positions of the load, the load being assumed by said element forwardly beyond the wheel-base of the truck and being within said wheel-base in its elevated position.

2. In a truck-jack, the combination of a truck-frame, carrying-wheel means therefor, said frame having track-means on which the carrying-wheel means is adapted to travel and having an extension-foot adapted to bear on the floor forwardly of said carrying-wheel means, an operating-handle, a load lifting and lowering element on said frame, and coacting means whereby actuation of said handle effects the travel of said carrying-wheel means on said track-means, the elevation and lowering of said element, the elevation and descent of said carrying-wheel means, and the lifting and lowering of said foot.

3. In a truck-jack, the combination of a truck-frame, rear carrying-wheel means therefor, front carrying-wheel means for and shiftable forwardly and rearwardly of said frame, a load lifting and lowering element extending forwardly beyond and adapted to assume the load beyond the front carrying-wheel means, an extension foot adapted to engage the floor forwardly beyond said front carrying-wheel means, an operating-handle, and coacting means whereby actuation of said handle causes the lifting or lowering of the load, the extension or contraction of the wheel-base of the truck, the raising and lowering of the front carrying-wheel means from and to the floor, and the lowering and raising of the extension-foot to and from the floor.

4. In a truck-jack, the combination of a truck-frame, rear carrying-wheel means therefor, front carrying-wheel means for and shiftable forwardly and rearwardly of said frame, a load lifting and lowering element extending forwardly beyond and adapted to assume the load beyond the front carrying-wheel means, an extension foot adapted to engage the floor forwardly beyond said front carrying-wheel means, an operating-handle, and coacting means whereby actuation of said handle causes the lifting or lowering of the load, the extension or contraction of the wheel-base of the truck, the raising and lowering of the front carrying-wheel means from and to the floor, and the lowering and raising of the extension-foot to and from the floor, the front carrying-wheel means contacting with the floor both when the load is in lowered and in an elevated position, the extension-foot engaging the floor during a portion of the load lifting and lowering operation, the load being within said wheel-base when elevated and beyond such wheel-base when in lowered position.

5. In a jack, the combination of a support, a load-lifting articulated automatically-folding lever extensible and contractible as to length fulcrumed on said support, a roller adapted to travel along said lever to effect the load lifting and lowering rocking action thereof, an operating-handle, and connecting-means between said handle and roller whereby actuation of the former causes the travel of the latter.

6. In a jack, the combination of a support, an articulated automatically-folding load lifting and lowering lever extensible and contractible as to length fulcrumed on said support, a roller adapted to travel beneath and in contact with a plurality of the articulated sections of said lever to operate the same, a handle rockingly mounted on said support, and means whereby said handle may actuate said roller step by step including a ratchet-bar, cooperating pawls and a pawl-controller.

7. In a jack, the combination of a support, a load lifting and lowering lever fulcrumed on said support, a roller adapted to travel along and in contact with said lever to operate the latter, a handle rockingly mounted on said support, and means whereby said handle may actuate said roller step by step including a ratchet-bar and cooperating pawls, said ratchet-bar being of sufficient length so that it may be pressed by the operator's foot to effect the initial movement thereof without resorting to the step by step action.

8. In a truck-jack, the combination of a truck-frame, carrying-wheels therefor extensible and contractible as to wheel-base, a load lifting and lowering lever fulcrumed on said frame, a roller adapted to travel along said lever to rock the latter, an operating-handle, and means whereby actuation of said handle simultaneously effects the travel of said roller and modifies the wheel-base of the truck.

9. In a truck-jack, the combination of a truck-frame, carrying-wheels therefor extensible and contractible as to wheel-base, an articulated automatically-folding load lifting and lowering lever fulcrumed on said frame, a roller adapted to travel along said lever to rock the latter, an operating-handle, and means whereby actuation of said handle simultaneously effects the travel of said roller and modifies the wheel-base of the truck.

10. In a truck-jack, the combination of a truck-frame, a load lifting and lowering lever fulcrumed on said frame, an axle mounted to shift lengthwise said frame, a roller on said axle adapted to travel lengthwise the lever to operate the latter, carrying-wheel means on said axle, an operating-handle, and connecting means between said handle and axle whereby the former may bodily shift the latter to effect the travel of said roller and to change the wheel-base of the truck.

11. In a truck-jack, the combination of a truck-frame, front and rear carrying-wheel means therefor, a trackway along which said front carrying-wheel means may travel to modify the wheel-base of the truck, means on said frame to raise and lower the load, an operating-handle therefor, and means whereby actuation of said handle raises and lowers said trackway from and to the floor and causes the travel of the front carrying-wheel means thereon.

12. In a truck-jack, the combination of a truck-frame, front and rear carrying-wheel means therefor, a load lifting and lowering lever fulcrumed on said frame constructed to assume the load in advance of and lower than the top of said front carrying-wheel means, and means to rock said lever and its load upwardly by feeding said front carrying-wheel means forwardly relatively to said frame to a point where its axis is beyond the load, the latter then being within the wheel-base of the truck.

13. In a truck-jack, the combination of a truck-frame, front and rear carrying-wheel means therefor, a load lifting and lowering lever fulcrumed on said frame constructed to assume the load in advance of and lower than the top of said front carrying-wheel means, and means to rock said lever and its load upwardly step by step and to feed said front carrying-wheel means forwardly step by step relatively to said frame to a point where its axis is beyond the load, the latter then being within the wheel-base of the truck.

14. In a truck-jack, the combination of a truck-frame, forward drum-equipped carrying-wheel means for said frame, rear carrying-wheel means for said frame, the frame having cam-track means on which said drum means is adapted to roll and having an extension-foot in front of said forward carrying-wheel means in the lowermost position of the load and adapted to bear on the floor and to be raised therefrom, an articulated load lifting and lowering lever fulcrumed on said frame, a stop on said lever coacting with said frame, a spring tending to rock said lever, a roller adapted to travel with said forward carrying-wheel means beneath said lever to effect its load lifting and lowering operation, a sliding ratchet-bar to shift said forward carrying-wheels and roller and projecting rearwardly sufficiently to enable the operator by pressing thereon to quickly initially raise said lever before it assumes the load, an operating-handle fulcrumed on said frame near its rear end, and means including pawls and a pawl-controller whereby said handle may feed said ratchet-bar step by step forwardly or rearwardly to correspondingly raise or lower the lever and its load, said cam-track means being so shaped that when said lever is in its lowered position and in an elevated position said forward carrying-wheels will bear on the floor and the extension-foot will be raised therefrom and in its intermediate positions said carrying-wheels will be raised from the floor and said extension foot will bear on the floor.

15. In a truck-jack, the combination of a truck-frame, rear carrying-wheel means for said frame, front carrying-wheel means for said frame, a load lifting and lowering element movably mounted on said frame, means to shift said front carrying-wheel means forwardly and rearwardly relatively to said frame to elongate and shorten the wheel-base of the truck and relatively to said element to raise and lower it, and a handle to actuate said shifting means, the travel of said carrying-wheel means being adequate to permit said element while in lowered position to assume its load ahead of the axis of said front carrying-wheel means and to support the load in raised position to the rear of said axis.

16. In a truck-jack, the combination of a truck-frame, rear carrying-wheel means for said frame, front carrying-wheel means for said frame, a load lifting and lowering element movably mounted on said frame, means to shift said front carrying-wheel means forwardly and rearwardly relatively to said frame to elongate and shorten the wheel-base of the truck and relatively to said element to raise and lower it, the travel of said carrying-wheel means being adequate to permit said element while in lowered position to assume its load ahead of the axis of said front carrying-wheel means and to support the load in raised position to the rear of said axis, an extension-foot on said frame adapted to bear on the floor substantially beneath the load during a portion of the elevation of the latter and to be raised therefrom, and an operating handle to actuate said shifting means and foot.

17. In a truck-jack, the combination of a truck-frame, rear carrying-wheel means for said frame, front carrying-wheel means for said frame, a load lifting and lowering element movably mounted on said frame, means to shift said front carrying-wheel means forwardly and rearwardly relatively to said frame to elongate and shorten the wheel-base of the truck and relatively to said element to raise and lower it, the travel of said carrying-wheel means being adequate to permit said element while in lowered position to assume its load ahead of the axis of said front carrying-wheel means and to support the load in raised position to the rear of said axis, an extension foot on said frame adapted to bear on the floor substantially beneath the load during a portion of the elevation of the latter and to be raised therefrom, an operating handle to actuate said shifting means, and means operated by said handle to raise said foot from the floor when said element is in its lowermost position and also in an elevated position, the foot resting on the floor during the remainder of the time.

18. In a truck-jack, the combination of a truck-frame, rear carrying-wheel means for said frame, front carrying-wheel means for said frame, a load lifting and lowering element movably mounted on said frame, means to shift said front carrying-wheel means forwardly and rearwardly relatively to said frame to elongate and shorten the wheel-base of the truck and relatively to said element to raise and lower it, the travel of said carrying-wheel means being adequate to permit said element while in lowered position to assume its load ahead of the axis of said front-carrying wheel means and to support the load in raised position to the rear of said axis, an extension foot on said frame adapted to bear on the floor substantially beneath the load during a portion of the elevation of the latter and to be raised therefrom, an operating handle to actuate said shifting means, means operated by said handle to raise said foot from the floor when said element is in its lowermost position and also in an elevated position, the foot resting on the floor during the remainder of the time, and means operated by said handle to raise said front carrying-wheel means from the floor during a part of the load-lifting operation.

19. In a truck-jack, the combination of a truck-frame, rear carrying-wheel means for said frame, front carrying-wheel means for said frame, a load lifting and lowering element movably mounted on said frame, means to shift said front carrying-wheel means forwardly and rearwardly relatively to said frame to elongate and shorten the wheel-base of the truck and relatively to said element to raise and lower it, the travel of said carrying-wheel means being adequate to permit said element while in lowered position to assume its load ahead of the axis of and forwardly below the top of said front carrying-wheel means and to support the load in raised position to the rear of said axis, and a handle to actuate said shifting means.

20. In a truck-jack, the combination of a truck-frame, rear carrying-wheel means for said frame, front carrying-wheel means for said frame, a load lifting and lowering element movably mounted on said frame, means to shift said front carrying-wheel means forwardly and rearwardly relatively to said frame to elongate and shorten the wheel-base of the truck and relatively to said element to raise and lower it, the travel of said carrying-wheel means being adequate to permit said element while in lowered position to assume its load ahead of the axis of and forwardly below the top of said front carrying-wheel means and to support the load in raised position to the rear of said axis, an extension foot on said frame adapted to bear on the floor substantially beneath the load during a portion of the elevation of the latter and to be raised therefrom, an operating handle to actuate said shifting means, means operated by said handle to raise said foot from the floor when said element is in its lowermost position and also in an elevated position, the foot resting on the floor during the remainder of the time, and means operated by said handle to raise said front carrying-wheel means from the floor during a part of the load-lifting operation.

In witness whereof I have hereunto set my hand.

HARRY C. BUFFINGTON.